United States Patent [19]
Oshima et al.

[11] Patent Number: 5,725,032
[45] Date of Patent: Mar. 10, 1998

[54] LIQUID CRYSTAL CELL FILLING METHOD AND APPARATUS

[75] Inventors: Nobumasa Oshima, Hirakata; Hideyuki Abe, Himeji, both of Japan

[73] Assignee: Ayumi Industry Company Limited, Hyogo-ken, Japan

[21] Appl. No.: 795,052

[22] Filed: Feb. 5, 1997

[30] Foreign Application Priority Data

Feb. 9, 1996 [JP] Japan ......................... 8-48058

[51] Int. Cl.$^6$ ............................... B65B 1/04
[52] U.S. Cl. ................. 141/70; 141/4; 141/31; 141/100; 349/189
[58] Field of Search ................. 141/4–8, 21, 31, 141/65, 100; 349/189, 154

[56] References Cited

U.S. PATENT DOCUMENTS

| | | | |
|---|---|---|---|
| 4,099,550 | 7/1978 | Matsuzaki et al. | 141/7 |
| 4,753,276 | 6/1988 | Inaba et al. | 141/7 |
| 5,399,114 | 3/1995 | Park | 141/7 |
| 5,406,989 | 4/1995 | Taizo | 141/7 |

*Primary Examiner*—Henry J. Recla
*Assistant Examiner*—Steven O. Douglas
*Attorney, Agent, or Firm*—Duane, Morris & Heckscher LLP

[57] ABSTRACT

A method for filling a liquid crystal (LC) cell with liquid crystal comprises the step of placing the LC cell having a LC cavity therein and LC inlet openings in its top and bottom edges, in a vacuum chamber which encloses upper and lower LC supply members each having a LC-impregnated yarn exposed through a slot therein. The method includes the steps of evacuating the vacuum chamber, moving the LC supply members to bring the yarns into contact with the top and bottom inlet openings of the cell, and returning the chamber to an atmospheric pressure to thereby cause liquid crystal to be sucked into the LC cavity through the inlet openings. Apparatus for filling a LC cell with liquid crystal is also provided.

17 Claims, 5 Drawing Sheets

LIQUID CRYSTAL CELL FILLING METHOD AND APPARATUS

This invention relates to a method and apparatus for filling liquid crystal (LC) cells for a flat panel liquid crystal display with liquid crystal.

BACKGROUND OF THE INVENTION

A typical liquid crystal (LC) cell for a liquid crystal display comprises two transparent substrates having thereon e.g. patterned transparent electrodes, color filters and an orientation film. The two substrates are joined together along their edges by a sealing material in such a manner that a LC cavity is defined by the sealing material and the substrates. The LC cell has a liquid crystal inlet opening through which liquid crystal is supplied into the cavity.

One of conventional methods for filling a LC cell with liquid crystal is a "contacting" method. In the contacting method, a LC cell and a vessel filled with liquid crystal are disposed in a vacuum chamber. The vacuum chamber is evacuated by a vacuum pump, and, then the liquid crystal inlet opening of the cell is brought into contact with the liquid crystal. Next, inert gas is fed into the chamber until the pressure in the chamber reaches an atmospheric pressure, so that the LC cavity is filled with the liquid crystal because of the pressure difference between the LC cavity and the vacuum chamber and capillary action provided by a small spacing between the substrates. According to one contacting method, an "immersion" method, liquid crystal is sucked up into an evacuated LC cavity of a LC cell through its inlet opening immersed in a quantity of liquid crystal. Another example of the contacting method is a "yarn" method. According to the yarn method, a LC inlet opening of a LC cell is brought into contact with liquid crystal absorbed in a thread or yarn of which one end is immersed in liquid crystal in a vessel. The thread is made of a material, e.g. glass fiber or rayon, which does not contaminate the liquid crystal. In place of a thread, unwoven fabric may be used. Still another example of the contacting method is a "float" method in which a dished portion is formed in a vessel of e.g. stainless steel or fluoroplastic and filled with liquid crystal in such a way that liquid crystal can swell above the brim of the dished portion due to its surface tension, and the inlet opening is contacted with the top portion of the swell of the liquid crystal.

In the immersion method, the entire end surface of the LC cell, in addition to the LC inlet opening, contacts with the liquid crystal, which results in loss of expensive liquid crystal. In addition, liquid crystal may be contaminated, which degrades the quality of LC cells.

In the yarn method, liquid crystal is less wasted because the LC inlet opening is contacted with a LC-impregnated thread only. But, the yarn method requires a LC-containing vessel of a relatively complicated structure.

To solve the problems associated with the contacting method, a "dripping" method may be used. In the dripping method, a LC cell is disposed with its LC inlet opening directed upward, and liquid crystal is dropped in droplets from a high-precision dispenser into a LC cavity through the inlet opening.

A spacing between substrates forming a LC cavity is very small, for example, on the order of several micrometers. Therefore, large LC cells for e.g. personal computers would require long time to fill them by either of the contacting and dripping methods.

One way to reduce the time for filling a LC cell with liquid crystal is to increase the area of the LC inlet opening or to use a larger number of LC inlet openings. In practice, however, restrictions are imposed on the area of the LC inlet opening and the number of the inlet openings, to prevent the opening(s) from interfering with pattern portions of LC driving circuitry disposed on the substrates near the inlet opening(s), and also to secure reliable sealing.

According to a conventional LC cell filling method, it may take 2–3 hours to fill with liquid crystal a LC cell for a personal computer which includes a LC cavity having a thickness of about 6 μm and an area of 300 mm×400 mm, and two inlet openings each having a width of 5–6 μm. Thus, the low rate of supply of liquid crystal into a cell has been one of causes which lower the productivity of LC cells.

SUMMARY OF THE INVENTION

The object of the present invention is to provide a method and apparatus which can fill liquid crystal (LC) cells with liquid crystal in a shorter time by raising the rate of supply of liquid crystal into a cell.

According to a first feature of the invention, a method for filling a LC cell with liquid crystal is provided. The LC cell includes two substrates which are joined together with a seal disposed along the peripheries thereof to thereby form a liquid crystal (LC) cavity between the substrates to be filled with liquid crystal. At least one liquid crystal (LC) inlet opening communicating with the LC cavity is provided in the seal in each of the top and bottom edges of the cell. The LC cell is placed in a vacuum chamber in which liquid crystal (LC) supply members are also disposed. The method according to the first feature includes the steps of reducing the pressure in the vacuum chamber, bringing the LC supply members into contact with the respective ones of the top and bottom LC inlet openings in the LC cell, and, thereafter, returning the pressure in the vacuum chamber to an atmospheric pressure, whereby the LC cavity is filled with the liquid crystal.

The LC cell filling method according to a first aspect of the first feature is characterized in that liquid crystal is supplied into the LC cavity through the top LC inlet opening by dropping droplets of the liquid crystal from a liquid crystal dispenser, and through the bottom LC inlet opening by a contacting method.

The LC cell filling method according to a second aspect of the first feature is characterized in that liquid crystal is supplied into the LC cavity through the top LC inlet opening by dropping droplets of the liquid crystal from a liquid crystal dispenser, and through the bottom LC inlet opening by a contacting method, and that the contacting method is carried out by contacting the bottom LC inlet opening with a thread impregnated with liquid crystal by immersion or suction.

The LC cell filling method according to a third aspect of the first feature is characterized in that liquid crystal is supplied into the LC cavity through both of the top and bottom LC inlet openings by a contacting method.

The LC cell filling method according to a fourth aspect of the first feature is characterized in that liquid crystal is supplied into the LC cavity through both of the top and bottom LC inlet openings by a contacting method and that the contacting method is carried out by contacting each of the top and bottom LC inlet openings with a thread impregnated with liquid crystal by immersion or suction.

According to a second feature of the invention, apparatus for filling a LC cell with liquid crystal is provided. The LC cell includes at least one top LC inlet opening and at least one bottom LC inlet opening formed in the seal sealing the top and bottom edges of the cell. The inlet openings are communicating with a LC cavity of the LC cell to be filled with liquid crystal. The apparatus includes a vacuum chamber adapted to enclose the LC cell therein, upper and lower LC supply means disposed within the vacuum chamber, LC supply means driving means for driving the upper and lower LC supply means downward and upward, respectively, to cause the supply means to contact with the top and bottom LC inlet openings, and an evacuating device for evacuating the vacuum chamber. In operation, the LC cell to be filled with liquid crystal is placed in the vacuum chamber, and the pressure in the vacuum chamber is reduced by operating the evacuating device. Then, the LC supply means driving means is operated to bring the LC supply means into contact with the LC inlet openings, and, thereafter, the vacuum chamber is returned to an atmospheric pressure, whereby the liquid crystal is supplied into the LC cavity through the top and bottom LC inlet openings.

Each of the upper and lower LC supply means may include a tubular member having a slot in its side. A thread impregnated with liquid crystal is placed in the tubular member, so that the thread is exposed through the slot in the tubular member. The LC supply means are selectively driven upward and downward so as to bring the threads exposed through the slots in the tubular members into contact with the associated ones of the top and bottom LC inlet openings.

Each of the upper and lower LC supply means may include inner and outer tubular members each having a slot in its side. A thread impregnated with liquid crystal is placed in the inner tubular member. One of the inner and outer tubular members is rotated or slid relative to the other so as to bring the slots in the respective tubular members in alignment with each other, so that the thread is exposed through the aligned slots, while each of the upper and lower LC supply means is being driven downward or upward so as to bring the thread exposed through the aligned slots in the tubular members into contact with the associated one of the top and bottom LC inlet openings.

According to another aspect of the second feature, a plurality of slots may be formed in the tubular member or in the inner and outer tubular members. These slots are aligned along the length of the tubular member or members at predetermined intervals, so that LC inlet openings of a corresponding number of LC cells can be brought into contact with the threads impregnated with liquid crystal which are exposed through the slots. Thus, a plurality of LC cells can be simultaneously filled with liquid crystal.

According to a third feature of the present invention, apparatus for filling a LC cell with liquid crystal is provided. The LC cell includes at least one top LC inlet opening and at least one bottom LC inlet opening formed in the seal sealing the top and bottom edges of the cell. The inlet openings are communicating with a LC cavity of the LC cell to be filled with liquid crystal. The apparatus include a first vacuum chamber adapted to enclose the LC cell therein. Upper and lower LC supply means are placed in second and third vacuum chambers. The first and second chambers and the first and third chambers can communicate with each other through respective gate valve devices. Evacuating means evacuates the first, second and third vacuum chambers. The upper and lower LC supply means are adapted to be brought into contact with the top and bottom LC inlet openings of the cell, respectively, by means of LC supply means driving means. In operation, first the LC cell is placed in the first chamber, and, then, the first, second and third vacuum chambers are evacuated by operating the evacuating means. Then, the gate valve devices are opened, and the upper and lower LC supply means are moved by the LC supply means driving means into the first chamber where the LC cell is placed. Then, the supply means driving means are operated to bring the upper and lower LC supply means into contact with the top and bottom inlet openings of the cell, and, thereafter, the three vacuum chambers which are in communication with each other via the gate valve devices are returned to an atmospheric pressure, whereby the liquid crystal is supplied into the LC cavity through the top and bottom LC inlet openings.

In the LC cell filling apparatus according to the third feature, each of the upper and lower LC supply means may include a tubular member having a slot in its side. A thread impregnated with liquid crystal is placed in the tubular member, so that the thread is exposed through the slot in the tubular member. The LC supply means are selectively driven upward and downward so as to bring the threads exposed through the slots in the tubular members into contact with the associated ones of the top and bottom LC inlet openings.

In the LC cell filling apparatus according to the third feature, each of the upper and lower LC supply means may include inner and outer tubular members each having a slot in its side. A thread impregnated with liquid crystal is placed in the inner tubular member.

One of the inner and outer tubular members is rotated or slid relative to the other so as to bring the slots in the respective tubular members in alignment with each other, so that the thread is exposed through the aligned slots, while each of the upper and lower LC supply means is being driven downward or upward so as to bring the thread exposed through the aligned slots in the tubular members into contact with the associated one of the top and bottom LC inlet openings.

According to another aspect of the third feature, a plurality of slots may be formed in the tubular member or in the inner and outer tubular members. These slots are aligned along the length of the tubular member or members at predetermined intervals, so that LC inlet openings of a corresponding number of LC cells can be brought into contact with the threads impregnated with liquid crystal which are exposed through the slots. Thus, a plurality of LC cells can be simultaneously filled with liquid crystal.

According to a fourth feature of the present invention, apparatus for filling a LC cell with liquid crystal is provided. The LC cell includes at least one top LC inlet opening and at least one bottom LC inlet opening formed in the seal sealing the top and bottom edges of the cell. The inlet openings are communicating with a LC cavity of the LC cell to be filled with liquid crystal. The apparatus includes a vacuum chamber adapted to enclose the LC cell therein. The vacuum chamber is evacuated by evacuating means. The apparatus further includes a LC supply member adapted to be brought into contact with the bottom LC inlet opening of the cell and a liquid crystal dispenser adapted to supply droplets of liquid crystal to the top LC inlet opening of the cell. Driving means is provided for moving the LC supply member and the dispenser upward and downward, respectively.

In operation, the LC cell is placed in the vacuum chamber, and, then, the pressure in the vacuum chamber is reduced by the evacuating means.

Thereafter, the driving means is operated to move upward the LC supply member to bring it into contact with the bottom LC inlet opening of the cell and also to move downward the dispenser so as to cause a droplet of the liquid crystal to fall down onto the top LC inlet opening of the cell.

Then, the vacuum chamber is returned to an atmospheric pressure, whereby the liquid crystal is supplied to the LC cavity through the top and bottom LC inlet openings.

According to a fifth feature of the present invention, apparatus for filling a LC cell with liquid crystal is provided. The LC cell includes at least one top LC inlet opening and at least one bottom LC inlet opening formed in the seal sealing the top and bottom edges of the cell. The inlet openings are communicating with a LC cavity of the LC cell to be filled with liquid crystal. The apparatus include a first vacuum chamber adapted to enclose the LC cell therein. A liquid crystal dispenser adapted to supply droplets of liquid crystal to the top inlet opening of the cell is disposed in a second vacuum chamber, and a LC supply member is disposed in a third vacuum chamber. The first and second chambers and the first and third chambers can communicate with each other through respective gate valve devices. Evacuating means evacuates the first, second and third vacuum chambers. Driving means is provided for moving the LC supply member and the dispenser upward and downward, respectively. In operation, first the LC cell is placed in the first chamber, and, then, the first, second and third vacuum chambers are evacuated by operating the evacuating means. Then, the gate valve devices are opened, and the LC supply member and the dispenser are moved upward and downward, respectively, by the driving means into the first chamber where the LC cell is placed. Then, the driving means moves upward the LC supply member to bring it into contact with the bottom LC inlet opening of the cell and moves downward the dispenser to cause a droplet of liquid crystal to fall onto the top LC inlet opening of the cell. Thereafter, the three vacuum chambers which are in communication with each other via the gate valve devices are returned to an atmospheric pressure, whereby the liquid crystal is supplied into the LC cavity through the top and bottom LC inlet openings.

DETAILED DESCRIPTION OF PREFERRED EMBODIMENTS

The liquid crystal (LC) cell filling method and apparatus according to the present invention are now described with reference to the attached drawings.

Figure 1A:
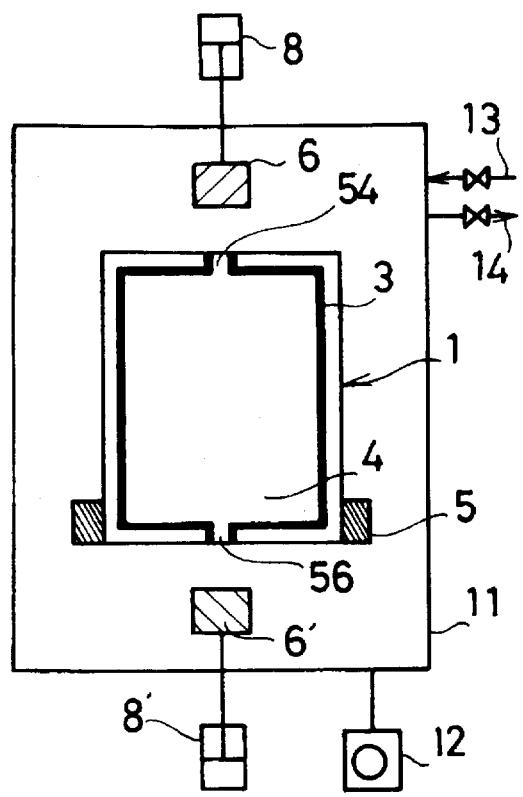
FIG. 1(a) is a front view of a LC cell filling apparatus according to one embodiment of the present invention when a vacuum chamber is being evacuated.

FIG. 1(a) is a schematic diagram illustrating a LC cell filling apparatus according to an embodiment of the present invention. A liquid crystal (LC) cell 1 includes two substrates joined together by a seal 3 in such a manner that a liquid crystal (LC) cavity 4 is formed therein. The seal 3 includes a top liquid crystal (LC) inlet opening 54 and a bottom LC inlet opening 56 in its top and bottom portions thereof. Liquid crystal is supplied to the LC cavity 4 through the top and bottom LC inlet openings 54 and 56.

The apparatus of the present invention includes a vacuum chamber 11 in which a LC cell 1 to be filled with liquid crystal is placed for filling it with liquid crystal. It should be understood that a plurality of such LC cells 1 mounted on a support 5, being uniformly spaced from adjacent ones, may be disposed in the vacuum chamber 11, as shown, for example, in FIG. 3.

Upper and lower liquid crystal (LC) supply members 6 and 6' are spaced upward and downward from the LC cell 1 at respective positions facing to the top and bottom inlet openings 54 and 56, respectively. Each LC supply member 6 or 6' is connected to an elevator 8 or 8' disposed outside the vacuum chamber 1 for moving the LC supply member 6 or 6' upward or downward so as to bring it into contact with the inlet opening 54 or 56. The apparatus also includes a vacuum pump 12, an inert gas inlet path 13 through which inert gas, e.g. nitrogen gas, is fed into the vacuum chamber 11 for returning the pressure in the vacuum chamber 11 to an atmosphere pressure, and an inert gas outlet path 14 for removing the gas after the filling operation is completed.

Figure 1B:
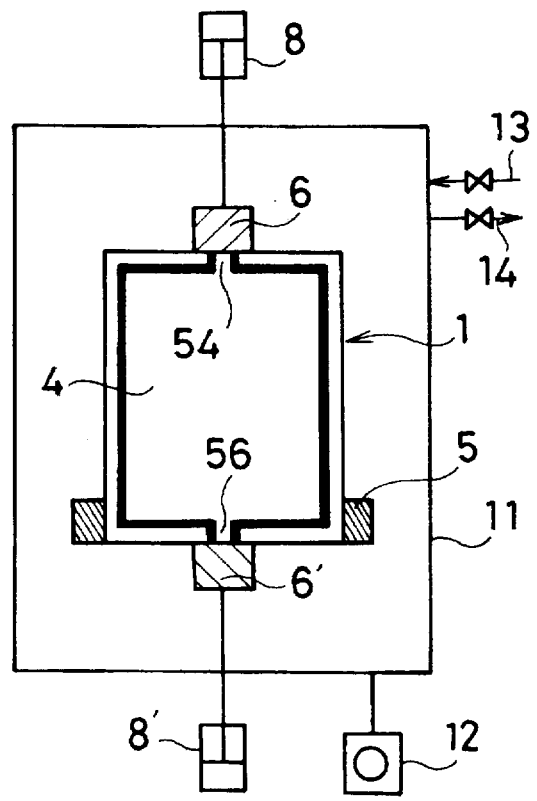
FIG. 1(b) is a front view of the LC cell filling apparatus of FIG. 1(a) when a cell is being filled with liquid crystal.

Next, the process of LC cell filling by use of the LC cell filming apparatus stated above is described. First, a LC cell 1 mounted on the support 5 is placed in the chamber 11, and the pressure in the vacuum chamber 11 is reduced to about $10^{-2}$–$10^{-3}$ Torr by the pump 12. During this evacuation, the LC cell is also evacuated, and, further, liquid crystal contained in the LC supply members 6 and 6' is sufficiently degassed. Then, the elevators 8 and 8' are driven to thereby contact the LC supply members 6 and 6' with the inlet openings 54 and 56 of the LC cell 1, as shown in FIG. 1(b).

Then, inert gas is introduced through the inlet path 13 into the chamber 11 to return the pressure in the chamber 11 to an atmospheric pressure, whereby the liquid crystal contained in the LC supply members 6 and 6' is supplied into the LC cavity 4 because of the pressure difference between the vacuum chamber 11 and the LC cavity 4 of the LC cell, and capillary action provided by a small spacing between the substrates.

In this embodiment, LC supply members of the same type may be used as the upper and lower LC supply members 6 and 6'.

The LC supply members 6 and 6' should properly supply liquid crystal to the inlet openings 54 and 56 without spilling liquid crystal. This is particularly so for the upper LC supply member 6.

Figure 2A:
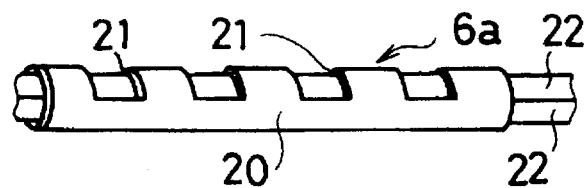
FIGS. 2(a) and 2(b) are perspective views of examples of LC supply members which can be used in the LC cell filling apparatus according to the present invention.
Figure 2B:
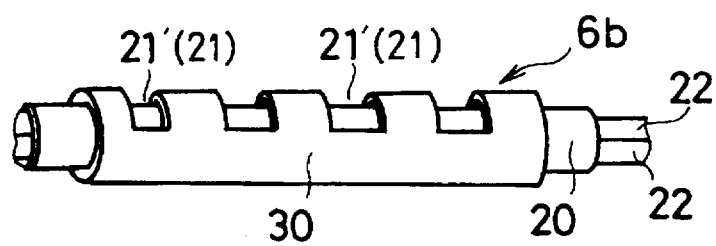

To prevent the dripping and spilling of liquid crystal, in the present invention, a LC supply member 6a as shown in FIG. 2(a) may be used. In FIG. 2(a), the LC supply member 6a includes a tubular member 20 having on its side a plurality of slots 21 aligned along the length of the member 20 at predetermined intervals and formed by removing a portion over a quarter to a half of the circumference of the tubular member, and a plurality of threads 22 impregnated with liquid crystal and passing through the tubular member 20. The slots 21 may have a width of e.g. about 4–6 mm, and the thread 22 may have a width of e.g. about 2–6 mm. Though plural threads are shown in FIGS. 2(a), 2(b) and 3, a single thread may be used.

Figure 3:
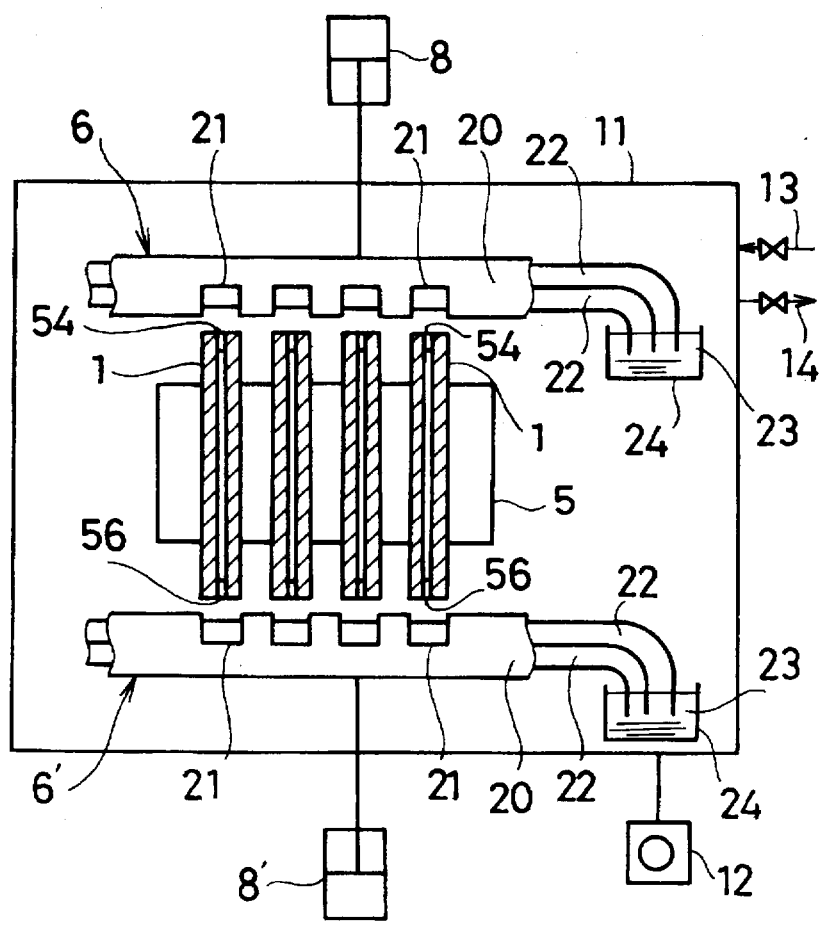
FIG. 3 is a schematic side view of a LC cell filling apparatus having the LC supply members of FIG. 2(a) when a vacuum chamber is being evacuated.

The intervals at which the slots 21 are aligned are selected in such a manner that the slots 21 are aligned with the respective inlet openings 54 or 56 of a plurality of LC cells 1 spaced uniformly and fixed to the support 5, as shown in FIG. 3.

The LC supply members 6 and 6' are disposed in the vacuum chamber 11, as shown in FIG. 3. Similar to the embodiment illustrated in FIGS. 1(a) and 1(b), after LC cells 1 are placed in the vacuum chamber 11, the chamber 11 is evacuated. Then, the upper and lower LC supply members 6 and 6' are moved by the elevators 8 and 8' until the LC-impregnated threads 22 exposed through the slots 21 contact with the top and bottom inlet openings 54 and 56 of the cells.

Then, the pressure in the vacuum chamber 11 is returned to an atmospheric pressure by introducing e.g. inert gas into the chamber, whereby the liquid crystal held in the threads 22 are sucked into the LC cavities 4 of the LC cells 1 through their top and bottom inlet openings 54 and 56.

If the liquid crystal held in the threads exhibits viscosity and surface tension enough to be held in the threads without dripping therefrom, the upper LC supply member 6 to be contacted with the top inlet openings 54 of the LC cells 1 can be disposed and held with its slots 21 facing downward, as shown in FIG. 3. If the liquid crystal used has such a viscosity and surface tension that it may drip from the threads when the upper LC supply member 6 is held with the slots 21 facing downward, the upper LC supply member 6 is first held in the vacuum chamber 11 with its slots 21 facing upward, and then rotated by 180° for contact with the top inlet openings 54 when the LC supply member 6 is moved down after the evacuation of the chamber.

In FIG. 3, one end of each thread 22 is immersed in liquid crystal 23 in a liquid crystal vessel 24. Alternatively, liquid crystal may be introduced into the threads 22 by injection by e.g. a pipette, injector or dispenser into an opening (not shown) formed in the side of the tubular member 20 opposite to the side in which the slots 21 are formed. The threads 22 are preferably made of a material which does not contaminate liquid crystal to be absorbed thereinto. The material of the threads 22 may be synthetic fiber or glass fiber. In place of threads, unwoven fabric may be used.

If the liquid crystal has too low viscosity to use with the LC supply member 6a shown in FIG. 2(a), a LC supply member 6b shown in FIG. 2(b) having two tubular members may be used at least for the upper LC supply member 6. The LC supply member 6b has an inner tubular member 20 having the same structure as the tubular member shown in FIG. 2(a), and an outer tubular member 30 into which the inner tubular member 20 is inserted. The outer tubular member 30 has slots 21' formed in the same way as the slots 21 of the inner tubular member 20. Threads 22 impregnated with the liquid crystal are placed in the inner tubular member 20. The outer tubular member 30 is fitted over the inner tubular member 20 so that at least one of the tubular members 20 and 30 can be rotated or slid for opening/closing the slots 21 in the inner tubular member 20. The LC supply member 6b is suitable for use in particular as the upper supply member 6. The upper supply member 6 may be disposed with the slots 21 in the inner tubular member 20 facing downward and closed by the outer tubular member 30.

Before the vacuum chamber 11 is evacuated, the slots 21 of the LC supply members 6 and 6' are closed. For supply of liquid crystal into the cells, the slots 21 of the LC supply member 6b are opened by rotation or slide of the tubular members, so that the threads are exposed through the slots and can be contacted with the inlet openings of the LC cells. Then, the pressure of the vacuum chamber is returned to an atmospheric pressure, whereby the liquid crystal held in the threads is supplied into the LC cavities of the cells.

Figure 4:
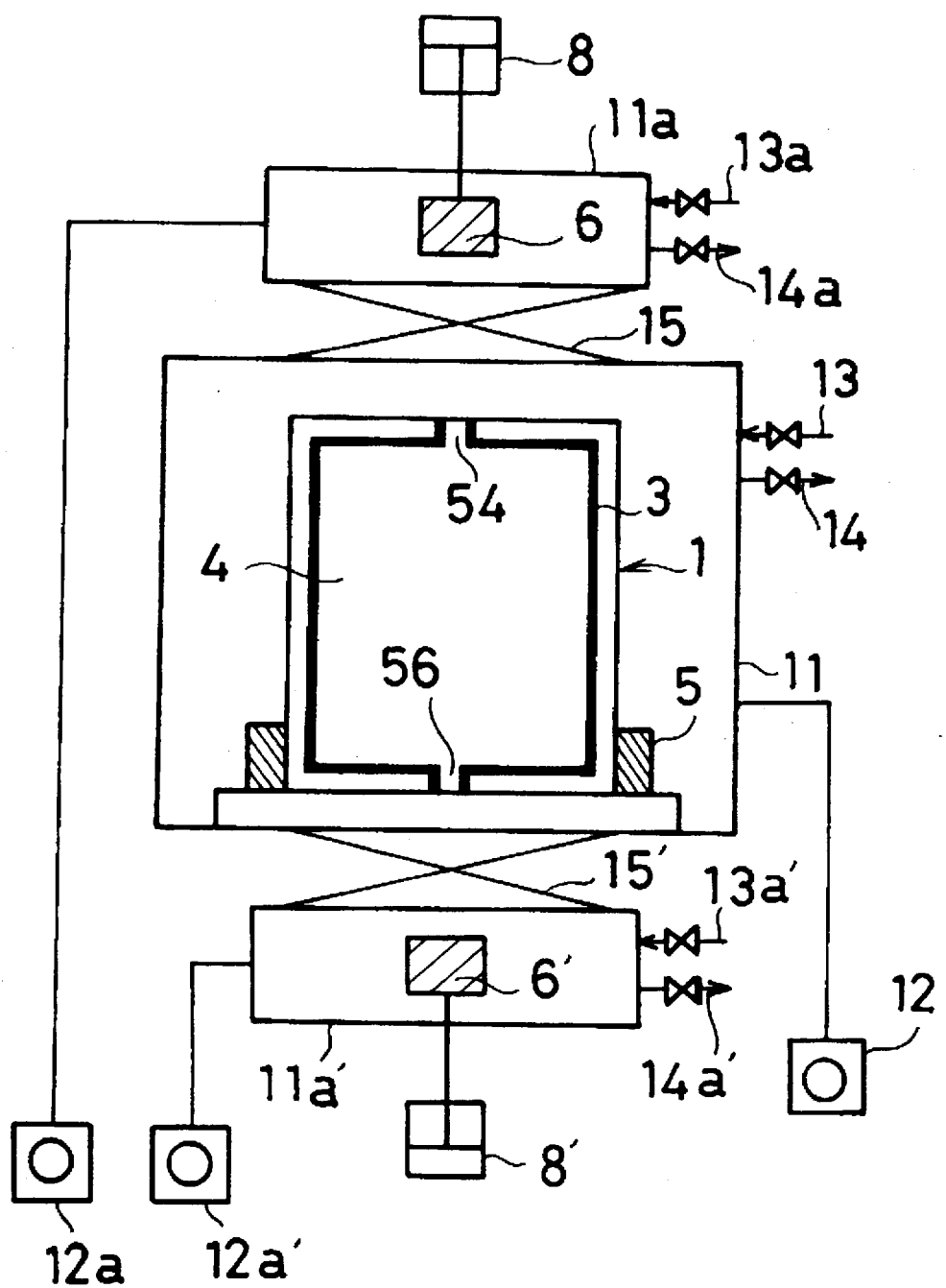
FIG. 4 illustrates a LC cell filling apparatus according to another embodiment of the present invention.

FIG. 4 is a schematic view of apparatus according to another embodiment of the present invention. The apparatus of FIG. 4 is different from that of FIGS. 1(a) and 1(b) in that a LC cell 1 to be filled with liquid crystal and LC supply means 6 and 6' are separately disposed in three respective vacuum chambers. The vacuum chamber 11 in which the LC cell 1 is to be disposed is used for LC cell filling process and referred to as "filling chamber", while each of the vacuum chambers 11a and 11a' in which the LC supply means 6 or 6' is disposed is used for degassing of liquid crystal and referred to as "degassing chamber". In the filling chamber 11, the LC cell 1 having top and bottom inlet openings 54 and 56 is supported by a support 5.

The LC supply means 6 and 6' respectively disposed in the individual degassing chambers 11a and 11a' are connected to respective elevators 8 and 8' disposed outside the degassing chambers. Gate valve devices 15 and 15' are disposed between the filling chamber 11 and the degassing chamber 11a and between the filling chamber 11 and the degassing chamber 11a', respectively. The gate valve devices 15 and 15' can connect the degassing chambers 11a and 11a' to the filling chamber 11 in an airtight fashion. The degassing chambers 11a and 11a' can be evacuated separately by vacuum pumps 12a and 12a', and the liquid crystal held in the LC supply members 6 and 6' is degassed. In operation, the gate valve devices 15 and 15' are opened, and the degassed LC supply members 6 and 6' are put into the filling chamber 11 by the elevators 8 and 8' in an airtight fashion. The LC supply members 6 and 6' are moved to contact with the inlet openings 54 and 56 of the LC cell 1.

The chambers 11, 11a and 11a' are connected to inert gas inlet and outlet paths 13 and 14, 13a and 14a, and 13a' and 14a', respectively. The pressure in the chambers is readily changed to an atmospheric pressure by introducing inert gas thereinto. Because the separate vacuum pumps and the separate inert gas inlet and outlet paths are used for the individual chambers, evacuation of the LC cell 1, degassing of the liquid crystal held in the LC supply members 6 and 6', and filling of the LC cell 1 can be achieved in a short time, and liquid crystal display panels exhibiting good performance result.

When the LC cell 1 and the LC supply members are disposed in the single vacuum chamber 11, evacuation of the LC cell may take a longer time due to evaporation of volatile components contained in liquid crystal. According to the embodiment illustrated in FIG. 4, the separation of filling and degassing chambers provides evacuation of a LC cell and degassing of liquid crystal in less time.

The LC supply members shown in FIG. 2(a) or 2(b) may be advantageously used as the LC supply members 6 and 6' of the apparatus shown in FIG. 4, too.

The use of the LC supply members 6a and 6b shown in FIGS. 2(a) and 2(b) as the upper and lower LC supply members 6 and 6' of the apparatus shown in FIGS. 1(a) and 1(b) or FIG. 4, substantially shortens the time for filling the cell and highly improves the cell productivity, in comparison with prior art LC cell filling apparatus in which liquid crystal is supplied through one inlet opening, for example, by dripping liquid crystal through the top inlet opening or by contacting the bottom inlet opening with liquid crystal. The LC supply member of the present invention may be used in combination with any conventional contacting method.

As described above, according to the present invention, a LC cell is provided with inlet openings in its top and bottom opposed edges, which are respectively contacted with LC supply members of the present invention or with a LC supply member of the present invention and a liquid crystal dripping dispenser. Furthermore, according to the present invention, a plurality of LC cells can be simultaneously filled with liquid crystal by simple operation. Thus, the time and cost for LC cell filling can be substantially reduced. The LC supply member of the present invention includes a tubular member having slots in its side and a thread impregnated with liquid crystal and inserted into the tubular member, and supplies the liquid crystal held in the thread into the LC cell. The LC supply member of the present invention enables supply of liquid crystal into a number of LC cells through top inlet openings in the cells, which is difficult according to conventional techniques. According to the present invention, liquid crystal can be simultaneously supplied from both of the upper and lower LC supply members into a plurality of cells through their top and bottom inlet openings, whereby the efficiency of supply of liquid crystal into the cell and thus the productivity of liquid crystal displays are improved.

Liquid crystal displays are now upsizing more and more. The present invention advantageously will improve the liquid crystal supply rate significantly, and, therefore, large LC cells for such large-sized liquid crystal displays can be filled in a shorter time.

According to the present invention, a minimum amount of liquid crystal contacts with only a small portion of a cell. This reduces loss and thus amount of liquid crystal used, and reduces the possibility of contamination of liquid crystal.

The present invention is described further with reference to the following example.

Figure 8:
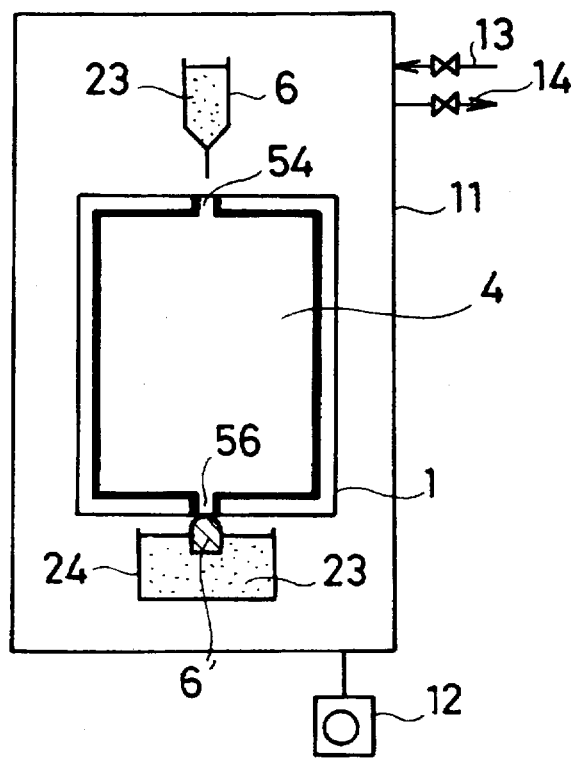
FIG. 8 shows a LC cell filling apparatus according to still another embodiment of the present invention.

FIG. 8 shows another embodiment of the present invention in which liquid crystal is supplied to a LC cavity 4 of a LC cell 1 through its bottom inlet opening 54 by means of any one of the contacting method and through its top inlet opening by a dripping method. In this embodiment, as the upper LC supply means 6, a dispenser which supplies liquid crystal in droplets is used. As the lower LC supply member 6', the member 6a or 6b shown in FIG. 2(a) or 2(b) can be used. Components similar to the ones shown in FIGS. 1(a) and 1(b) are assigned the same reference numerals and no descriptions are given here. In FIG. 8, elevators corresponding to the elevators 8 and 8' shown in FIGS. 1(a) and 1(b) are not shown.

EXAMPLE

As shown in FIG. 3, 20 units of 5-inch LC cells 1 each including inlet openings 54 and 56 having a size of 8 mm in the top and bottom edges of the cell were placed in a vacuum chamber 1. The cells were mounted on a support 5 with a spacing of 5 mm disposed between adjacent cells with the respective top inlet openings and the respective bottom inlet openings aligned.

Two LC supply members 6 and 6' were used. The LC supply member 6a shown in FIG. 2(a) was used for the LC supply members 6 and 6' Each LC supply member was formed of a stainless steel tube 20 having a diameter of 10 mm and a wall thickness of about 0.5 mm. Slots 21 having a width of about 5 mm were formed in a side of the tube 20 at center-to-center intervals of 10 mm in such a manner that the slots corresponded to the positions of the inlet openings 54 or 56 of the LC cells 1 mounted on the support 5. Five rayon yarns each having a diameter of about 2 mm were inserted into the stainless steel tube 20. One of the two LC supply members 6a was disposed above the cells 1 at a predetermined distance therefrom with its slots 21 facing downward, and the other was disposed below the cells 1 at a predetermined distance therefrom with its slots 21 facing upward. One end of each yarn of each LC supply member 6a was immersed in liquid crystal 23 in a LC vessel 24.

After the LC cells 1 were disposed in the vacuum chamber 11 with the LC supply members set therein as stated above, the pressure in the chamber was reduced to $10^{-2}$–$10^{-3}$ Torr. Then, the LC supply member 6 disposed above the cell was moved downward by an elevator 8, whereby the yarns impregnated with liquid crystal 28 and exposed through the slots 21 were brought into contact with all the top inlet openings 54 of the cells 1. Concurrently, the yarns of the LC supply member 6' disposed below the cell were similarly brought into contact with the bottom inlet openings 56. Thereafter, inert gas was introduced into the vacuum chamber 11 through a gas inlet path 13 to thereby change the pressure in the chamber to an atmospheric pressure, so that the liquid crystal held in the yarns was sucked into the LC cavities due to the pressure difference and, thus, the LC cavities of the cells were filled with liquid crystal.

Figure 5:
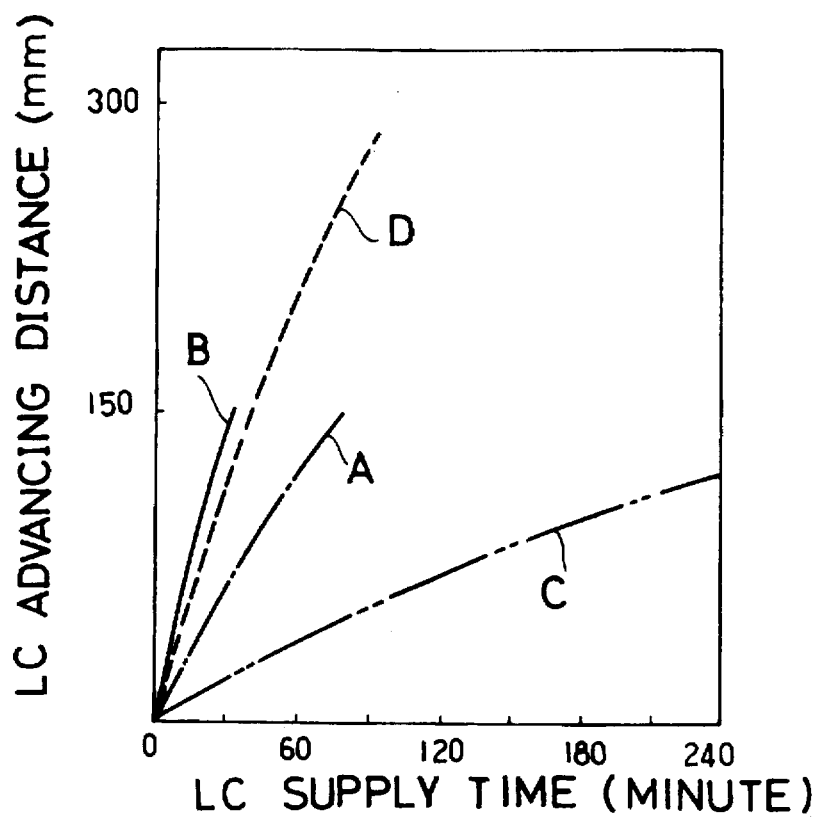
FIG. 5 illustrates the rate of supply of liquid crystal when the present invention is implemented.

FIG. 5 shows the distance that liquid crystal advances into a LC cavity of a 5-inch LC cell with time.

In FIG. 5, a curve A shows the distance-time relationship obtained when liquid crystal was supplied into a 5-inch LC cell through only its bottom inlet opening by a conventional yarn method, and a curve B shows the distance-time relationship obtained when liquid crystal was supplied into a 5-inch LC cell through its top and bottom inlet openings by the method described in the EXAMPLE.

Figure 6:
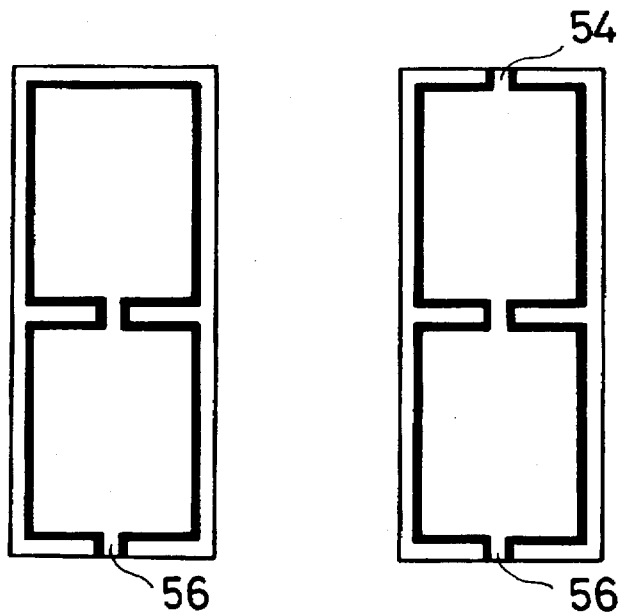
FIGS. 6(a) and 6(b) illustrate examples of joint LC cell used for collection of data in FIG. 5.

FIG. 5 also shows similar relationships obtained for double-cells shown in FIGS. 6(a) and 6(b). Each of the double-cells includes two cells similar to the one described above, which are vertically disposed and joined together along the bottom and top edges of the upper and lower cells with the bottom and top inlet openings of the upper and lower cell communicating with each other. The double-cell shown in FIG. 6(a) is provided with a bottom LC inlet opening 56 only, while the double-cell shown in FIG. 6(b) is provided with both top and bottom LC inlet openings 54 and 56. After the two liquid crystal cavities of the double-cell are filled with liquid crystal, the double-cell is separated into two cells.

In FIG. 5, a curve C is for the double-cell of FIG. 6(a) filled with liquid crystal by a conventional "yarn" method, and a curve D is for the double-cell of FIG. 6(b) filled with liquid crystal in accordance with the present invention as described in the above EXAMPLE.

Figure 7:
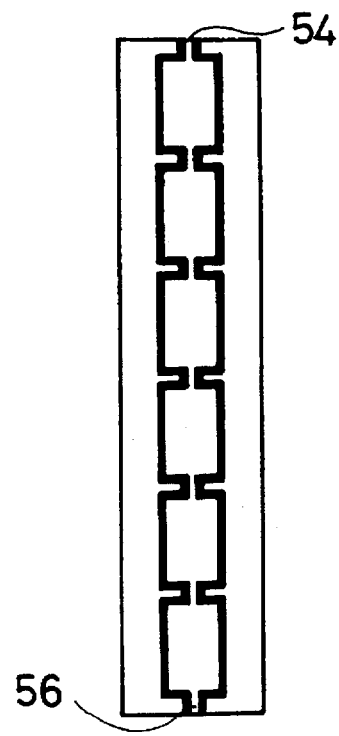
FIG. 7 illustrates another example of joint LC cell which can be filled with liquid crystal according to the present invention.

If liquid crystal cells to be filled with liquid crystal are of a size less than 5 inch by 5 inch, two or more of such cells may be vertically joined together into a joint cell in such a manner that the liquid crystal cavity of an upper cell communicates with that of a lower cell through its bottom inlet opening and the top inlet opening of the lower cell. A plurality of such cells joined together are provided with a top LC inlet opening in the top-most cell, and a bottom LC inlet opening in the bottom-most cell. FIG. 7 shows an example of such joint cell, in which six cells are joined together. Such joint cell can be filled with liquid crystal in a short time when the LC cell filling method according to the present invention is used.

For example, a joint cell formed by joining six individual cells, each having a size of 32 mm×8 mm, and provided with top and bottom inlet openings 54 and 56 having a diameter of 3 mm was filled with liquid crystal in 12 minutes, while a conventional "yarn" method using only the bottom inlet opening 56, with the top inlet opening 54 closed, took 38 minutes for filling the joint cell. That is, the present invention requires less than one-third of the time required by the conventional "yarn" method.

What is claimed is:

1. A method for filling a liquid crystal cell with liquid crystal, said liquid crystal cell including two substrates joined together with a seal disposed along the peripheries thereof whereby a liquid crystal cavity to be filled with liquid crystal is defined by said substrates and said seal, said cell including, in the seal in the top and bottom edges of the cell, at least one top liquid crystal inlet opening and at least one bottom liquid crystal inlet opening which are in communication with the liquid crystal cavity, said cell being adapted to be placed in a vacuum chamber in which liquid crystal supply means are also disposed, said method comprising the steps of reducing the pressure in said vacuum chamber, bringing the liquid crystal supply means into contact with the respective ones of said top and bottom inlet openings of said liquid crystal cell, and, thereafter, returning the pressure in the vacuum chamber to an atmospheric pressure, whereby the liquid crystal is supplied into said liquid crystal cavity.

2. The method according to claim 1 wherein liquid crystal is supplied to said liquid crystal cavity through said top inlet opening by dripping the liquid crystal from a liquid crystal dispenser, and, at the same time, through said bottom inlet opening by a contacting method.

3. The method according to claim 2 wherein said contacting method is carried out by contacting said bottom inlet opening with a thread impregnated with liquid crystal by immersing said thread in the liquid crystal or by causing said thread to suck the liquid crystal.

4. The method according to claim 1 wherein liquid crystal is supplied to said liquid crystal cavity through both of said top and bottom inlet openings by a contacting method.

5. The method according to claim 4 wherein said contacting method is carried out by contacting said top and bottom inlet openings with associated threads impregnated with liquid crystal by immersing said threads in the liquid crystal or by causing said threads to suck the liquid crystal.

6. Apparatus for filling a liquid crystal cell with liquid crystal, said liquid crystal cell including two substrates joined together with a seal disposed along the peripheries thereof whereby a liquid crystal cavity to be filled with liquid crystal is defined by said substrates and said seal, said cell including, in the seal in the top and bottom edges of the cell, at least one top liquid crystal inlet opening and at least one bottom liquid crystal inlet opening which are in communication with the liquid crystal cavity, said apparatus comprising:

a vacuum chamber adapted to enclose the liquid crystal cell therein;

upper and lower liquid crystal supply means disposed within said vacuum chamber;

liquid crystal supply means driving means for driving said upper and lower liquid crystal supply means downward and upward, respectively, to cause said upper and lower liquid crystal supply means to contact with said top and bottom liquid crystal inlet openings; and an evacuating device for evacuating said vacuum chamber;

wherein the liquid crystal cell to be filled with liquid crystal is placed in said vacuum chamber, the pressure in said vacuum chamber is reduced by operating said evacuating device, then, said liquid crystal supply means driving means is operated to bring said upper and lower liquid crystal supply means into contact with said top and bottom liquid crystal inlet openings, respectively, and, thereafter, said vacuum chamber is returned to an atmospheric pressure, whereby the liquid crystal is supplied into said liquid crystal cavity through said top and bottom crystal cell inlet openings.

7. The apparatus according to claim 6 wherein each of said upper and lower liquid crystal supply means includes a tubular member having a slot in a side thereof with a thread impregnated with liquid crystal placed in said tubular member in such a manner that said thread is exposed through said slot; and said upper and lower liquid crystal supply means are driven upward and downward, respectively, so as to bring said threads exposed through said slots in said respective tubular members into contact with the associated ones of said top and bottom liquid crystal inlet openings.

8. The apparatus according to claim 6 wherein each of said upper and lower liquid crystal supply means includes inner and outer tubular members each having a slot in its side with a thread impregnated with liquid crystal placed in said inner tubular member, said inner and outer tubular members being relatively rotatable or slidable with each other so as to bring the slots in said inner and outer tubular members in alignment with each other, so that the thread can be exposed through the aligned slots; and said upper and lower liquid crystal supply means are driven downward and upward, respectively, so as to bring said threads exposed through the respective aligned slots in said tubular members into contact with the associated ones of said top and bottom liquid crystal inlet openings.

9. The apparatus according to claim 7 wherein said tubular member of each of said upper and lower supply means includes a plurality of slots in a side thereof, said slots being aligned along the length of said tubular member with a predetermined spacing disposed between adjacent slots, whereby the top and bottom inlet openings of a corresponding number of liquid crystal cells can be brought into contact with said threads exposed through said plurality of slots for simultaneously filling said liquid crystal cells with liquid crystal.

10. The apparatus according to claim 8 wherein each of said inner and outer tubular members of each of said upper and lower supply means includes a plurality of slots in a side thereof, said slots in each tubular member being aligned along the length of that tubular member with a predetermined spacing disposed between adjacent slots, whereby the top and bottom inlet openings of a corresponding number of liquid crystal cells can be brought into contact with said threads exposed through said plurality of aligned slots for simultaneously filling said liquid crystal cells with liquid crystal.

11. Apparatus for filling a liquid crystal cell with liquid crystal, said liquid crystal cell including two substrates joined together with a seal disposed along the peripheries thereof whereby a liquid crystal cavity to be filled with liquid crystal is defined by said substrates and said seal, said cell including, in the seal in the top and bottom edges of the cell, at least one top liquid crystal inlet opening and at least one bottom liquid crystal inlet opening which are in communication with the liquid crystal cavity, said apparatus comprising:

a first vacuum chamber adapted to enclose the liquid crystal cell therein;

a second vacuum chamber;

a third vacuum chamber;

upper liquid crystal supply means placed in said second vacuum chamber;

lower liquid crystal supply means placed in said third vacuum chamber;

a first airtight gate valve device for selectively separating said second vacuum chamber from said first vacuum chamber, and making said second vacuum chamber and said first vacuum chamber communicate with each other;

a second airtight gate valve device for selectively separating said third vacuum chamber from said first vacuum chamber, and making said third vacuum chamber and said first vacuum chamber communicate with each other;

evacuating means for evacuating said first, second and third vacuum chambers; and liquid crystal supply means driving means for driving said upper and lower liquid crystal supply means so as to bring said upper and lower liquid crystal supply means into contact with said top and bottom liquid crystal inlet openings of the cell, respectively;

wherein said first, second and third vacuum chambers with the liquid crystal cell placed in said first vacuum chamber are evacuated by said evacuating means; then, said first and second gate valve devices are opened; thereafter, said upper and lower liquid crystal supply means are moved into said first chamber; then, said supply means driving means are operated to bring said upper and lower liquid crystal supply means into contact with said top and bottom inlet openings of the cell; and, thereafter, said first, second and third vacuum chambers are returned to an atmospheric pressure, whereby liquid crystal is supplied into the liquid crystal cavity through said top and bottom liquid crystal inlet openings.

12. The apparatus according to claim 11 wherein each of said upper and lower liquid crystal supply means includes a tubular member having a slot in a side thereof with a thread impregnated with liquid crystal and placed in said tubular member in such a manner that said thread is exposed through said slot; and said upper and lower liquid crystal supply means are driven upward and downward, respectively, so as to bring said threads exposed through said slots in said respective tubular members into contact with the associated ones of said top and bottom liquid crystal inlet openings.

13. The apparatus according to claim 12 wherein said tubular member of each of said upper and lower supply means includes a plurality of slots in a side thereof, said slots being aligned along the length of said tubular member with a predetermined spacing disposed between adjacent slots, whereby the top and bottom inlet openings of a corresponding number of liquid crystal cells can be brought into contact with said threads exposed through said plurality of slots for simultaneously filling said liquid crystal cells with liquid crystal.

14. The apparatus according to claim 11 wherein each of said upper and lower liquid crystal supply means includes inner and outer tubular members each having a slot in its side with a thread impregnated with liquid crystal placed in said inner tubular member, said inner and outer tubular members being relatively rotatable or slidable with each other so as to bring the slots in said inner and outer tubular members in alignment with each other, so that the thread are exposed through the aligned slots; and said upper and lower liquid crystal supply means are driven downward and upward, respectively, so as to bring said threads exposed through the respective aligned slots in said tubular members into contact with the associated ones of said top and bottom liquid crystal inlet openings.

15. The apparatus according to claim 14 wherein each of said inner and outer tubular members of each of said upper and lower supply means includes a plurality of slots in a side thereof, said slots in each tubular member being aligned along the length of that tubular member with a predetermined spacing disposed between adjacent slots, whereby the top and bottom inlet openings of a corresponding number of liquid crystal cells can be brought into contact with said threads exposed through said plurality of aligned slots for simultaneously filling said liquid crystal cells with liquid crystal.

16. Apparatus for filling a liquid crystal cell with liquid crystal, said liquid crystal cell including two substrates joined together with a seal disposed along the peripheries thereof whereby a liquid crystal cavity to be filled with liquid crystal is defined by said substrates and said seal, said cell including, in the seal in the top and bottom edges of the cell, at least one top liquid crystal inlet opening and at least one bottom liquid crystal inlet opening which are in communication with the liquid crystal cavity, said apparatus comprising:

a vacuum chamber adapted to enclose the liquid crystal cell therein;

evacuating means for evacuating said vacuum chamber;

a liquid crystal supply member adapted to be brought into contact with the bottom liquid crystal inlet opening of the cell;

a liquid crystal dispenser adapted to supply droplets of liquid crystal to said top liquid crystal inlet opening of the cell; and driving means for moving said liquid crystal supply member and dispenser upward and downward, respectively;

wherein the pressure in said vacuum chamber with the liquid crystal cell disposed therein is reduced by said evacuating means, thereafter, said driving means is operated to move upward said liquid crystal supply member to bring said liquid crystal supply member into contact with said bottom liquid crystal inlet opening of the cell and also to move downward said dispenser so as to cause a droplet of the liquid crystal to fall down onto said top liquid crystal inlet opening of the cell, and, then, said vacuum chamber is returned to an atmospheric pressure, whereby the liquid crystal is supplied to said liquid crystal cavity through said top and bottom liquid crystal inlet openings.

17. Apparatus for filling a liquid crystal cell with liquid crystal, said liquid crystal cell including two substrates joined together with a seal disposed along the peripheries thereof whereby a liquid crystal cavity to be filled with liquid crystal is defined by said substrates and said seal, said cell including, in the seal in the top and bottom edges of the cell, at least one top liquid crystal inlet opening and at least one bottom liquid crystal inlet opening which are in communication with the liquid crystal cavity, said apparatus comprising:

a first vacuum chamber adapted to enclose the liquid crystal cell therein;

a second vacuum chamber;

a third vacuum chamber;

a liquid crystal supply member adapted to supply liquid crystal to said liquid crystal cavity through said bottom liquid crystal inlet opening, said member being placed in said second vacuum chamber;

a liquid crystal dispenser adapted to supply droplets of liquid crystal to said top liquid crystal inlet opening of the cell, said dispenser being placed in said third vacuum chamber;

a first airtight gate valve device for selectively separating said second vacuum chamber from said first vacuum chamber, and making said second vacuum chamber and said first vacuum chamber communicate with each other;

a second airtight gate valve device for selectively separating said third vacuum chamber from said first vacuum chamber, and making said third vacuum chamber and said first vacuum chamber communicate with each other;

evacuating means for evacuating said first, second and third vacuum chambers; and driving means for driving said liquid crystal supply member and said liquid crystal dispenser, so that said liquid crystal supply member contacts with said bottom liquid crystal inlet opening and said liquid crystal dispenser supplies a droplet of the liquid crystal to said top liquid crystal inlet opening of the cell;

wherein said first, second and third vacuum chambers with the liquid crystal cell placed in said first vacuum chamber are evacuated by said evacuating means; then, said first and second gate valve devices are opened; thereafter, said liquid crystal supply member and liquid crystal dispenser are moved into said first chamber; then, said driving means are operated to bring said liquid crystal supply member into contact with said bottom liquid crystal inlet opening and to cause said liquid crystal dispenser to supply a droplet of the liquid crystal to said top liquid crystal inlet opening of the cell; and, thereafter, said first, second and third vacuum chambers are returned to an atmospheric pressure, whereby the liquid crystal is supplied into the liquid crystal cavity through said top and bottom liquid crystal inlet openings.

* * * * *